United States Patent
Kaneta

(10) Patent No.: US 9,481,756 B2
(45) Date of Patent: Nov. 1, 2016

(54) CURABLE COMPOSITION

(75) Inventor: Mitsuhiro Kaneta, Tokyo (JP)

(73) Assignee: ThreeBond Fine Chemical Co., Ltd., Kanagawa (JP)

(*) Notice: Subject to any disclaimer, the term of this patent is extended or adjusted under 35 U.S.C. 154(b) by 650 days.

(21) Appl. No.: 13/635,023

(22) PCT Filed: Mar. 16, 2011

(86) PCT No.: PCT/JP2011/056314
§ 371 (c)(1),
(2), (4) Date: Sep. 14, 2012

(87) PCT Pub. No.: WO2011/115191
PCT Pub. Date: Sep. 22, 2011

(65) Prior Publication Data
US 2013/0005854 A1    Jan. 3, 2013

(30) Foreign Application Priority Data

Mar. 18, 2010    (JP) ................................. 2010-062204

(51) Int. Cl.
*C08F 299/02*    (2006.01)
(52) U.S. Cl.
CPC .................... *C08F 299/028* (2013.01)
(58) Field of Classification Search
CPC ........................... C08L 63/00; C08F 299/028
USPC ....................................................... 523/400
See application file for complete search history.

(56) References Cited

U.S. PATENT DOCUMENTS

| | | | | |
|---|---|---|---|---|
| 5,262,476 A * | 11/1993 | Laughner | ................ | C08L 33/06 525/133 |
| 5,543,448 A * | 8/1996 | Laughner | ................ | C08L 33/06 524/109 |
| 6,329,463 B1 * | 12/2001 | Abraham et al. | ........... | 525/92 A |
| 2003/0036601 A1 * | 2/2003 | Attarwala et al. | ............ | 524/561 |
| 2008/0293885 A1 * | 11/2008 | Morimoto et al. | ........... | 524/876 |
| 2012/0258247 A1 * | 10/2012 | Niwa et al. | ................ | 427/208.4 |

FOREIGN PATENT DOCUMENTS

| | | |
|---|---|---|
| JP | 62115010 A | 5/1987 |
| JP | 10060381 A | 3/1998 |
| JP | 2003119208 A | 4/2003 |
| JP | 2003232376 A | 8/2003 |
| JP | 2004331879 A | 11/2004 |
| JP | 2007224155 A | 9/2007 |
| JP | 2008204645 A | 9/2008 |
| JP | 20093369 A | 1/2009 |

OTHER PUBLICATIONS

English language machine translation of JP 2007-224155. Translation printed Feb. 2015. Original Japanese document published Sep. 2007.*
International Search Report (PCT/ISA/210) dated Jun. 14, 2011, issued by the International Searching Authority in corresponding International Application No. PCT/JP2011/056314.
Written Opinion (PCT/ISA/237) dated Jun. 14, 2011, issued by the International Searching Authority in corresponding International Application No. PCT/JP2011/056314.

* cited by examiner

*Primary Examiner* — Megan McCulley
(74) *Attorney, Agent, or Firm* — Sughrue Mion, PLLC

(57) ABSTRACT

The present invention relates to a curable composition including: (a) at least one compound having at least one (meth)acrylic functional group in the molecule thereof, which is selected from a (meth)acrylic monomer and a (meth)acrylic oligomer; (b) an organic peroxide; (c) an o-benzoic sulfimide; and (d) an oxazoline compound, in which the component (d) is contained in an amount of 0.005 to 10 parts by mass based on 100 parts by weight of the component (a).

5 Claims, No Drawings

CURABLE COMPOSITION

TECHNICAL FIELD

The present invention relates to a curable composition comprising an acrylic functional compound as a main component, which is useful for adhesion and encapsulation applications and can reduce in a gas generated after a curing reaction.

BACKGROUND OF THE INVENTION

A curable composition having an acrylic functional group, particularly an anaerobic curable composition, uses a (meth) acrylic acid ester monomer as a main component and has a property that as long as it is contacted with air or oxygen (hereinafter, simply referred to as air), the composition is stably held in a liquid state for a long period of time with no occurrence of gelling and is rapidly cured when air is blocked or eliminated, and by making use of such a property, the composition has been used, for example, for adhesion or fixing of a screw, a bolt or the like, fixing of a mating component, adhesion between flange surfaces, or filling of a hole formed in a seal or a cast component.

The anaerobic curable composition exhibits rapid curability at ordinary temperature and keeps stable physical properties even after curing and therefore, its utilization for electrical/electronic components and the like is recently increasing. Particularly, in the field of motors, from the standpoint of productivity, an anaerobic curable composition combined with a curing accelerator is used, for example, for adhesion of a bearing and its shaft or fitting and adhesion of a peripheral portion thereof (see, for example, Patent Document 1).

While the above-described characteristics are known, the anaerobic curable composition has a problem that an outgas derived from a low-molecular volatile acrylic monomer contained in a raw material causes contamination of a substrate. Particularly, in the case where the substrate is an electrical/electronic component, the contaminated part may affect the quality of the final product, and attempts have been heretofore made to reduce the outgas. Examples thereof include a method of reducing the amount added of a volatile acrylic monomer that works out to a main component of the outgas, and blending a polyfunctional acrylate, and a method of blending a peroxide that undergoes rapid thermal decomposition, thereby swiftly consuming an unreacted volatile acrylic monomer.

In addition, there have been proposed techniques of, for example, blending a glycidyl group-containing compound and an amine compound in an anaerobic curable composition (Patent Document 2) or further imparting ultraviolet curability to an anaerobic curable composition having a high glass transition temperature (Patent Document 3).

BACKGROUND ART

Patent Document

Patent Document 1: JP-A-2003-119208
Patent Document 2: JP-A-2004-331879
Patent Document 3: JP-A-2003-232376

SUMMARY OF THE INVENTION

Problems that the Invention is to Solve

However, in the method of reducing the amount added of a volatile acrylic monomer, it is difficult to impart fluidity to the composition, whereby it leads to bad workability, and since a volatile acrylic monomer derived from a raw material component remains in the polyfunctional acrylate, the essential problem is not solved. In the method of blending a peroxide that undergoes rapid thermal decomposition, the reaction gradually proceeds even at low temperature due to instability of the peroxide, whereby it gives rise to a problem in the storage stability.

In the technique of blending a glycidyl group-containing compound and an amine compound in an anaerobic curable composition, the system must be substantially a two-component mixing type and due to bad workability at the coating or slow set time, there is a problem also in the productivity. In the technique of further imparting ultraviolet curability to an anaerobic curable composition having a high glass transition temperature, since the composition is mere a combination of substantially known components, it is envisaged that the balance of the glass transition temperature greatly fluctuates by the change in design according to the characteristics, and the essential problem still remains.

Means for Solving the Problems

As a result of assiduous studies of the inventors to solve above-described conventional problems, they have found that the problems can be solved by a composition having the following configuration.

That is, an adhesive with reduction of outgas can be provided by (1) a curable composition comprising: (a) at least one compound having at least one (meth)acrylic functional group in the molecule thereof, which is selected from a (meth)acrylic monomer and a (meth)acrylic oligomer; (b) an organic peroxide; (c) an o-benzoic sulfimide; and (d) an oxazoline compound, wherein the component (d) is contained in an amount of 0.005 to 10 parts by weight based on 100 parts by weight of the component (a).

The present invention is characterized by the oxazoline compound (d) and thanks to this component, outgas generation can be effectively reduced without adversely affecting various physical properties such as curability of the curable composition. Specifically, the unreacted low-molecular-weight acrylic compound is converted to a high-molecular compound through a reaction with the oxazoline compound, and generation source of the outgas is thereby blocked. The reaction mechanism is not clearly known, but it is considered that a polymerization reaction by zwitterionic polymerization occurs between the oxazoline compound and the low-molecular-weight acrylic compound as an electrophilic substance and furthermore, when a compound having a plurality of oxazoline groups is used as the oxazoline compound, the acrylic compound polymers are crosslinked through the oxazoline group to form a strong structure. Incidentally, JP-A-62-115010 discloses a thermosetting composition comprising, for example, a polyester compound, an oxazoline compound having two oxazoline groups in the molecule thereof, and a (meth)acrylic compound, but in this composition, the oxazoline compound is used to crosslink the polyester compound through a reaction therewith and impart appropriate flow characteristics, and the purposes and effects thereof are utterly different from those of the oxazoline compound for use in the present invention.

Furthermore, the oxazoline compound contained in the present invention is low in both volatility and odor, less likely to cause an unnecessary side reaction, well compatible with the acrylic compound and high in the reaction rate with the acrylic compound and therefore, can formulate a curable composition having preferred characteristics particularly in the usage for precise adhesion to electrical/electronic components and the like.

As a preferred embodiment of the present invention, any of the following configurations is preferably taken.

(2) The curable composition according to (1) above, wherein the component (b) is contained in an amount of 0.005 to 5 parts by weight, the component (c) is contained in an amount of 0.05 to 10 parts by weight, and the component (d) is contained in an amount of 0.01 to 5 parts by weight, based on 100 parts by weight of the component (a).

(3) The curable composition according to (1) or (2) above, wherein the component (a) comprises at least a compound having an aromatic ring skeleton and having two or more (meth)acryloyl groups in the molecule thereof (4) The curable composition according to any one of (1) to (3) above, wherein the component (d) is a compound having two or less oxazoline groups in the molecule thereof (5) The curable composition according to any one of (1) to (4) above, wherein the component (d) is a compound represented by the following formula (I):

[Chem. 1]

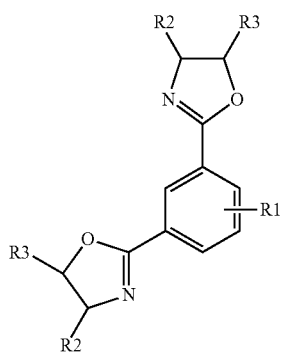

wherein R1 is selected from hydrogen, a substituted or unsubstituted alkyl group having a carbon number of 1 to 6, a cyclic alkyl group and a halogen, and one R1 or a plurality of R1 may be present and may be the same as or different from one another; and each of R2 and R3 is selected from hydrogen, a substituted or unsubstituted alkyl group having a carbon number of 1 to 10, a cyclic alkyl group, an aromatic heterocyclic ring, an aliphatic heterocyclic ring and a halogen and may be the same as or different from one another.

(6) The curable composition according to any one of (1) to (5) above, further having curability imparted by means of at least one energy selected from heating and active light irradiation.

Advantage of the Invention

The curable composition of the present invention can form a cured product reduced in the outgas generation amount while having rapid curability of an anaerobic curable composition and ease of the adhesion step and can be suitably used in particular for a component requiring precise processing accuracy in the production, such as electrical/electronic components.

MODE FOR CARRYING OUT THE INVENTION

The compound (a), which is used in the present invention, having at least one (meth)acrylic functional group in the molecule thereof and being selected from a (meth)acrylic monomer and a (meth)acrylic oligomer includes a compound having an acrylic functional group such as acryl group and methacryl group at the molecular terminal or in the side chain, and a combination of their derivatives. As the (meth)acrylic functional monomer or oligomer, a monofunctional monomer or oligomer and a polyfunctional monomer or oligomer may be used, and in the present invention, these may be suitably used in combination, if desired.

Specific examples of the monofunctional (meth)acrylic monomer or (meth)acrylic oligomer include methyl(meth)acrylate, ethyl(meth)acrylate, butyl(meth)acrylate, lauryl (meth)acrylate, stearyl(meth)acrylate, tetrahydrofurfuryl (meth)acrylate, caprolactone-modified tetrahydrofurfuryl (meth)acrylate, cyclohexyl(meth)acrylate, dicyclopentanyl (meth)acrylate, isobornyl(meth)acrylate, benzyl (meth)acrylate, phenyl(meth)acrylate, phenoxyethyl(meth)acrylate, phenoxydiethylene glycol (meth)acrylate, phenoxytetraethylene glycol (meth)acrylate, nonylphenoxyethyl (meth)acrylate, nonylphenoxytetraethylene glycol (meth)acrylate, methoxydiethylene glycol (meth)acrylate, ethoxydiethylene glycol (meth)acrylate, butoxyethyl (meth)acrylate, butoxytriethylene glycol (meth)acrylate, 2-ethylhexylpolyethylene glycol (meth)acrylate, nonylphenylpolypropylene glycol (meth)acrylate, methoxydipropylene glycol (meth)acrylate, glycidyl(meth)acrylate, 2-ethylhexyl (meth)acrylate, 2-hydroxyethyl(meth)acrylate, 2-hydroxypropyl(meth)acrylate, glycerol(meth)acrylate, polyethylene glycol(meth)acrylate, polypropylene glycol(meth)acrylate, epichlorohydrin (hereinafter simply referred to as ECH)-modified (meth)acrylate, ECH-modified phenoxy(meth)acrylate, ethylene oxide (hereinafter simply referred to as EO)-modified phthalic acid (meth)acrylate, EO-modified succinic acid (meth)acrylate, caprolactone-modified 2-hydroxyethyl(meth)acrylate, N,N-dimethylaminoethyl(meth)acrylate, N,N-diethylaminoethyl(meth)acrylate, morpholino (meth)acrylate, and EO-modified phosphoric acid (meth)acrylate.

Specific examples of the polyfunctional (meth)acrylic monomer or (meth)acrylic oligomer include a bifunctional acrylic monomer or acrylic oligomer such as 1,3-butylene glycol di(meth)acrylate, 1,4-butylene glycol di(meth)acrylate, neopentyl glycol di(meth)acrylate, 1,6-hexane glycol di(meth)acrylate, ethylene glycol di(meth)acrylate, polyethylene glycol di(meth)acrylate, propylene glycol di(meth)acrylate, tripropylene glycol di(meth)acrylate, EO-modified neopentyl glycol di(meth)acrylate, propylene oxide (hereinafter simply referred to as PO)-modified neopentyl glycol di(meth)acrylate, bisphenol A di(meth)acrylate, EO-modified bisphenol A di(meth)acrylate, bisphenol F (meth)acrylate, EO-modified bisphenol F di(meth)acrylate, ECH-modified bisphenol A di(meth)acrylate, EO-modified bisphenol S di(meth)acrylate, hydroxypivalic acid ester neopentyl glycol diacrylate, caprolactone-modified hydroxypivalic acid ester neopentyl glycol diacrylate, neopentyl glycol-modified trimethylolpropane di(meth)acrylate, stearic acid-modified pentaerythritol di(meth)acrylate, dicyclopentenyl diacrylate, EO-modified dicyclopentenyl di(meth)acrylate and di(meth)acryloyl isocyanurate; a trifunctional acrylic monomer or acrylic oligomer such as trimethylolpropane tri(meth)acrylate, pentaerythritol tri(meth)acrylate, EO-modified trimethylolpropane tri(meth)acrylate, PO-modified trimethylolpropane tri(meth)acrylate, ECH-modified trimethylolpropane tri(meth)acrylate, ECH-modified glycerol tri(meth)acrylate and tris(acryloyloxyethyl)isocyanurate; and a tetrafunctional or higher functional acrylic monomer or acrylic oligomer such as ditrimethylolpropane tetra(meth)acrylate, pentaerythritol tetra(meth)acrylate, dipentaerythritol monohydroxypenta(meth)acrylate, alkyl-modified dipentaerythritol pentaacrylate, dipentaerythritol hexa(meth)acrylate and caprolactone-modified dipentaerythritol hexa(meth)acrylate, but the component (a) for use in the present invention is not limited thereto, and those conventionally used in the field of anaerobic curable compositions may be used. Also, one of these acrylic monomers and acrylic oligomers may be used alone, or two or more thereof may be used as a mixture.

Incidentally, in the present invention, the (meth)acrylic oligomer is used for the purpose of mainly adjusting the viscosity of the curable composition or adjusting the characteristics of the cured product, and above all, for example, an acrylic oligomer having a maleate group, a fumarate group or an allyl group, an isocyanate-modified acrylic oligomer, a polyester acrylic oligomer, a polyether acrylic oligomer, a novolak-type, polyhydric alcohol-type, polybasic acid-type or polybutadiene-type epoxy modified acrylic oligomer, and a polyester-type or polyether-type urethane-modified acrylic oligomer can be suitably used.

In the present invention, it is particularly preferred that the component (a) comprises a compound having an aromatic ring skeleton and having two or more (meth)acryloyl groups in the molecule thereof. Thanks to the addition of this compound, not only the adhesive strength is improved when the curable composition is used as an adhesive, but also since the residual component (d) used in the present invention acts as a crosslinking agent, and the physical properties of the cured product can be more enhanced. Examples of the (meth)acryloyl group-containing compound which can be suitably used include bisphenol A di(meth)acrylate, EO-modified bisphenol A di(meth)acrylate, alkoxy-modified bisphenol A di(meth)acrylate, bisphenol F (meth)acrylate, EO-modified bisphenol F di(meth)acrylate, alkoxy-modified bisphenol F di(meth)acrylate, ECH-modified bisphenol A di(meth)acrylate, bisphenol S di(meth)acrylate, EO-modified bisphenol S di(meth)acrylate, alkoxy-modified bisphenol S di(meth)acrylate and ECH-modified bisphenol S di(meth)acrylate.

Furthermore, in the present invention, the component (a) preferably comprises a (meth)acrylic monomer having a hydrophilic functional group in the molecule thereof. Thanks to the addition of the hydrophilic functional group-containing (meth)acrylic monomer, not only the compatibility of the component (d) in the curable composition is improved but also successful reaction with the component (d) contributes also to the enhancement of the strength of the composition after curing. The (meth)acrylic monomer having a hydrophilic functional group within the molecular is not particularly limited, but in view of availability, 2-hydroxyethyl(meth)acrylate, 2-hydroxypropyl(meth)acrylate, 2-hydroxybutyl(meth)acrylate and the like can be suitably used.

The organic peroxide (b) for use in the present invention has been conventionally used in an anaerobic curable composition and is not particularly limited and, for example, ketone peroxides such as methyl ethyl ketone peroxide, cyclohexanone peroxide, 3,3,5-trimethylcyclohexanone peroxide, methylcyclohexanone peroxide, methylacetoacetate peroxide and acetylacetone peroxide; peroxyketals such as 1,1-bis(tert-butylperoxy)-3,3,5-trimethylcyclohexane, 1,1-bis(tert-butylperoxy)cyclohexane, 2,2-bis(tert-butylperoxy)octane, n-butyl-4,4-bis(tert-butylperoxy)valerate and 2,2-bis(tert-butylperoxy)butane; hydroperoxides such as tert-butyl hydroperoxide, cumene hydroperoxide, diisopropylbenzene hydroperoxide, p-menthane hydroperoxide, 2,5-dimethylhexane-2,5-dihydroperoxide and 1,1,3,3-tetramethylbutyl hydroperoxide; dialkyl peroxides such as di-tert-butyl peroxide, tert-butylcumyl peroxide, dicumyl peroxide, α,α'-bis(tert-butylperoxy-m-isopropyl)benzene, 2,5-dimethyl-2,5-di(tert-butylperoxy)hexane, 2,5-dimethyl-2,5-di(tert-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide and m-toluoylbenzoyl peroxide; peroxy dicarbonates such as diisopropylperoxy dicarbonate, di-2-ethylhexylperoxy dicarbonate, di-n-propylperoxy dicarbonate, bis(4-tert-butylcyclohexyl)peroxy dicarbonate, dimyristylperoxy dicarbonate, di-2-ethoxyethylperoxy dicarbonate, dimethoxyisopropylperoxy dicarbonate, di(3-methyl-3-methoxybutyl)peroxy dicarbonate and diallylperoxy dicarbonate; peroxy esters such as tert-butylperoxy acetate, tert-butylperoxy isobutyrate, tert-butylperoxy pivalate, tert-butylperoxy neodecanoate, cumylperoxy neodecanoate, tert-butylperoxy-2-ethylhexanoate, tert-butylperoxy-3,5,5-trimethyl hexanoate, tert-butylperoxy laurate, tert-butylperoxy benzoate, di-tert-butylperoxy isophthalate, 2,5-dimethyl-2,5-di(benzoylperoxy)hexane, tert-butylperoxymaleic acid, tert-butylperoxyisopropyl carbonate, cumylperoxy octoate, tert-hexylperoxy neodecanoate, tert-hexylperoxy pivalate, tert-butylperoxy neohexanoate, tert-hexylperoxy neohexanoate and cumylperoxy neohexanoate; and organic peroxides such as acetylcyclohexylsulfonyl peroxide and tert-butylperoxy allyl carbonate, can be used individually or as a mixture of two or more thereof.

The component (b) for use in the present invention is preferably contained in an amount of 0.005 to 5 parts by weight based on 100 parts by weight of the total weight of the acrylic monomer and oligomer. If the amount thereof is less than 0.005 parts by weight, this amount is insufficient to cause a polymerization reaction of the component (a), whereas if the amount thereof exceeds 5 parts by weight, the stability of the curable composition is impaired.

The component (c) for use in the present invention is an o-benzoic sulfimide and is a component usually used for anaerobically curing an acrylic curable composition. The o-benzoic sulfimide is a substance called saccharin and as for the amount added thereof, the component (c) is preferably blended in an amount of 0.05 to 10 parts by weight based on 100 parts by weight of the component (a).

The component (d) for use in the present invention is an oxazoline compound and is not particularly limited, but this component is preferably a compound having two or less oxazoline groups in the molecule thereof. Examples of the component (d) which can be used include 2-methyloxazoline, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, 2-isopropenyl-5-ethyl-2-oxazoline, 2,2,4-trimethyl-2-oxazoline, 2-isopropyl-2-oxazoline, 2-phenyl-2-oxazoline, 2,2'-bis(2-oxazoline), and 2,2'-(1,3-phenylene)bis(2-oxazoline). As for the amount added, the component (d) is preferably added in an amount of 0.005 to 10 parts by weight, more preferably from 0.01 to 5 parts by weight, based on 100 parts by weight of the component (a). If the amount added is less than 0.005 parts by weight, the efficiency of outgas generation reduction as the effect of the present invention is low, whereas if the amount added exceeds 10 parts by weight, the storage stability of the composition may be lowered, and the component (d) may bleed out of the composition after curing.

In the present invention, as the component (d), a compound having a chemical structure represented by the following chemical formula (I) is preferably used. Examples of such a substance which can be, among others, suitably used include 2,2'-(1,3-phenylene)bis(2-oxazoline), 2,2'-(1,3-phenylene)bis[(4S)-4-methyl-2-oxazoline], 2,2'-(1,3-phenylene)bis(4,4-dimethyl-2-oxazoline), 2,2'-(2-iodo-1,3-phenylene)bis(4,4-dimethyl-2-oxazoline), 2,2'-(2-bromo-1,3-phenylene)bis(4,4-dimethyl-2-oxazoline), 2,2'-(5-tert-butyl-1,3-phenylene)bis(4,4-dimethyl-2-oxazoline), 2,2'-(1,3-phenylene)bis[(4R)-4-ethyl-2-oxazoline], 2,2'-(1,3-phenylene)bis[(4S)-4β-isopropyl-2-oxazoline], 2,2'-(2-bromo-1,3-phenylene)bis[(4S)-4β-isopropyl-2-oxazoline], 2,2'-(1,3-phenylene)bis[(4S)-4-tert-butyl-2-oxazoline], 2,2'-(1,3-phenylene)bis[(4S)-4β-phenyl-2-oxazoline], 2,2'-(1,3-phenylene)bis[(4R)-4α-phenyl-2-oxazoline], 2,2'-(1,3-phenylene)bis[(4S)-4β-benzyl-2-oxazoline], 2,2'-(1,3-phenylene)bis[(4S)-4β-butyl-2-oxazoline], and 2,2'-(1,3-phenylene)bis[(4S)-4β-(cyclohexylmethyl)-2-oxazoline].

[Chem. 2]

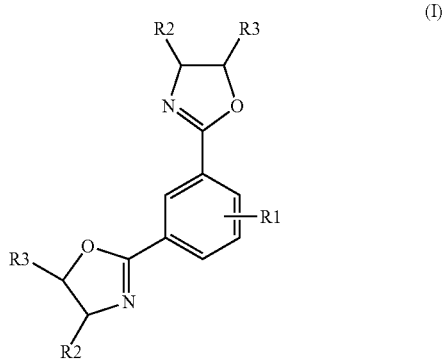

(I)

wherein R1 is selected from hydrogen, a substituted or unsubstituted alkyl group having a carbon number of 1 to 6, a cyclic alkyl group and a halogen, and one R1 or a plurality of R1 may be present and may be the same as or different from one another; and each of R2 and R3 is selected from hydrogen, a substituted or unsubstituted alkyl group having a carbon number of 1 to 10, a cyclic alkyl group, an aromatic heterocyclic ring, an aliphatic heterocyclic ring and a halogen and may be the same as or different from one another.

The reason why an oxazoline compound having a structure of a plurality of oxazoline groups being connected through a phenylene group is preferred is that as described above, a low molecular acrylic compound such as unreacted acrylic monomer or acrylic oligomer is polymerized through bonding of its acryl groups by using each oxazoline group as a starting point and is further crosslinked by a rigid phenylene group and therefore, the low molecular acrylic compound is consumed, making it possible to more effectively confine a component responsible for outgas generation.

As for the base compound of the composition of the present invention, a component for accelerating the polymerization can be further added. Such components include an amine compound and a mercaptan compound as well as o-benzoic sulfimide. Examples of the amine compound include a heterocyclic secondary amine such as 2-ethylhexylamine, 1,2,3,4-tetrahydroquinoline and 1,2,3,4-tetrahydroquinaldine, a heterocyclic tertiary amine such as quinoline, methylquinoline, quinaldine and quinoxalinephenazine, aromatic tertiary amines such as N,N-dimethyl-para-toluidine, N—N-dimethyl-anisidine and N,N-dimethylaniline, and an azole-based compound such as 1,2,4-triazole, oxazole, oxadiazole, thiadiazole, benzotriazole, hydroxybenzotriazole, benzoxazole, 1,2,3-benzothiadiazole and 3-mercaptobenzotriazole. Examples of the mercaptan compound include a linear mercaptan such as n-dodecyl mercaptan, ethyl mercaptan and butyl mercaptan, but are not limited thereto.

Particularly, in the present invention, thermal energy is preferably added for the purpose of accelerating the reaction of the component (a) and the component (d), and by utilizing this heat, a thermal polymerization reaction may be caused in the component (a). A thermal polymerization reaction in the component (a) can be caused by adding an appropriate amount of an organic peroxide of the compounds such as cumene hydroperoxide, dicumyl peroxide and tert-butyl perbenzoate, which are capable of being activated by heating to generate a radical.

Also, since the mode of curing reaction used in the present invention is a so-called anaerobic curing reaction, it is possible to impart curability by active light irradiation for the purpose of curing a portion protruded from a gap of an adhered substrate such as metal. The active light curability can be imparted by adding a photopolymerization initiator to the composition, and examples of the photopolymerization initiator which can be used include a carbonyl-based compound such as benzophenone, acetophenone, propiophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, p-diacetylbenzene, 3-methoxybenzophenone, 4-allylacetophenone, 4-chloro-4-benzylbenzophenone, 3-chloroxanthone, 3,9-dichloroxanthone, 3-chloro-8-nonylxanthone, benzoyl, benzoyl methyl ether, bis(4-dimethylaminophenyl)ketone, benzyl methoxy ketal, 2-chlorothioxanthone, 2,4,6-trimethylbenzoyldiphenylphosphine oxide, benzyl, camphorquinone, 3-ketocoumarin, anthraquinone, α-naphthyl, acenaphthene, p,p'-dimethoxybenzyl and p,p'-dichlorobenzyl, a thioxanthone-based compound such as 2-chlorothioxanthone, 2-methylthioxanthone, 2,4-diethylthioxanthone and 2,4-dimethylthioxanthone, and acylphosphine oxides such as 2,4,6-trimethylbenzoyldiphenylphosphine oxide, bis(2,6-dimethoxybenzoyl)-2,4,4-trimethyl-pentylphosphine oxide, bis(2,6-dichlorobenzoyl)-4'-n-propylphenylphosphine oxide and bis(2,6-dimethylbenzoyl)diphenylphosphine oxide.

As for the heat curability and the active light curability, either one may be imparted, or both may be imparted at the same time. In the case of imparting both at the same time, this can be realized by adding a thermal polymerization initiator and a photopolymerization initiator to the composition. The amounts added thereof are determined so that a component for polymerizing the radical polymerizable compound and a factor for inhibiting the polymerization of the radical polymerizable compound can be present together and the balance between two components can be appropriately set, but in general, the amount added is preferably 0.05 to 5 parts by weight in the case of the photopolymerization initiator and from 0.1 to 5 parts by weight in the case of the peroxide for thermal polymerization, based on 100 parts by weight of the component (a).

The curable composition of the present invention may contain a polymerizable unsaturated compound such as unsaturated polyester resin and unsaturated acrylic resin, for the same purpose as that of the above-described acrylic oligomer. This polymerizable unsaturated compound can be used in combination with the acrylic functional monomer or oligomer.

In the curable composition of the present invention, various additives can be used. For example, in order to obtain storage stability, a radical absorbent such as benzoquinone, hydroquinone and hydroquinone monomethyl ether, and a metal chelator such as ethylenediaminetetraacetic acid or a disodium salt thereof, oxalic acid, acetylacetone and o-aminophenol, may be also added.

In addition, for adjusting the nature of the curable composition of the present invention or the properties of the cured product, a thickener, a filler, a plasticizer, a coloring agent, and the like can be used, if desired. The amounts added thereof may be determined by appropriately adjusting the amount according to the required characteristics.

EXAMPLES

The effects of the present invention are described in detail below by referring to Examples, but the present invention is not limited to these Examples.

Blending compositions according to Examples 1 to 8 and Comparative Examples 1 to 3 were produced as follows.

As the component (a), 70 parts by weight of epoxy acrylate (NK Ester EH1010, trade name, product of Shin-Nakamura Chemical Co., Ltd.), 20 parts by weight of 2-hydroxyethyl methacrylate and 10 parts by weight of isobornyl methacrylate (IBX, trade name, product of Kyoeisha Chemical Co., Ltd.); as the component (b), 1 part by weight of cumene hydroperoxide (PERCUMYL H-80, trade name, product of NOF Corporation); as the component (c), 1 part by weight of o-benzoic sulfimide; and as other additives, 0.3 parts by weight of acetylphenylhydrazine, 0.2 parts by weight of 1,2,3,4-tetrahydroquinoline, 0.02 parts by weight of EDTA.2Na, and 1 part of 1-hydroxycyclohexan-1-yl phenyl ketone (Irgacure 184, trade name, product of Ciba Corporation) were prepared and designated as Blending Composition 1, and thereto, 0 to 30 parts by weight of Oxazoline 1 (2,2'-(-1,3-phenylene)bis(2-oxazoline)) was added as the component (d) to obtain curable composition samples.

The prepared curable composition sample was coated on a mating test piece (Fe, 6φ×15 mm, clearance: 1/100, adhesion area: 283 mm$^2$) and after assembling, cured under the conditions of 25° C.×24 hours, and the portion slightly protruded from the lateral part was cured by the irradiation with an ultraviolet ray of 30 kJ/m$^2$ from a high-pressure mercury lamp. This assembly was used as the evaluation test piece and subjected to various evaluations. As for the evaluation item, the adhesive strength was evaluated by measuring the mating adhesion strength by means of a universal tester (TENSILON RTF-2410, manufactured by Orientec Co., Ltd., compression mode: 10 mm/min). In the evaluation of curing rate, the mating test piece coated with the curable composition sample and assembled was subjected to curing for a predetermined time and measured by the compression tester above, and the set time was evaluated by the time at which a strength of 1 kgf was developed. The outgas reducing action was evaluated by the percentage thermogravimetric change and specifically, 10 mg of the curable composition sample cured was collected from the mating test specimen above and measured for the percentage thermogravimetric decrease. The device used for measuring the percentage thermogravimetric decrease was TG/DTA220 manufactured by Seiko Instruments Inc., and by employing measurement conditions of 90° C.×16 hours and assuming the initial weight is 100%, the percentage thermogravimetric decrease after 16 hours was taken as the measured value. In the evaluation of stability, 5 g of the curable composition was weighed in a test tube and left standing still in a constant temperature bath at 80° C., and the time until the composition was gelled was measured and used for the evaluation. The stability was rated "A" when not gelled in 2 hours and rated "B" when gelled. In the evaluation of solubility, Oxazoline 1 was added to Blending Composition 1 in an atmosphere of 50° C. and after stirring, the solubility was rated "A" when the compound was dissolved within 8 hours in the course of continuing the stirring, rated "B" when 8 hours or more was required for the dissolution, and rated "C" when not dissolved. The amount added of Oxazoline 1 in each of Examples and Comparative Examples and physical property evaluation results of each sample are shown in Table 1. Incidentally, in the Tables below, all of the numerical values of the blending amount are "parts by weight".

TABLE 1

| | Comparative Example 1 | Example 1 | Example 2 | Example 3 | Example 4 | Example 5 | Example 6 | Example 7 | Example 8 | Comparative Example 2 | Comparative Example 3 |
|---|---|---|---|---|---|---|---|---|---|---|---|
| Blending Composition 1 | 100 | 100 | 100 | 100 | 100 | 100 | 100 | 100 | 100 | 100 | 100 |
| Oxazoline 1 | 0 | 0.05 | 0.1 | 0.2 | 0.5 | 1.0 | 2.0 | 5.0 | 10.0 | 20.0 | 30.0 |
| Mating adhesion strength (MPa) | 30.2 | 31.2 | 32.1 | 34.2 | 33.2 | 31.5 | 30.3 | 32.4 | 28.4 | — | — |
| Set time (min) | 2 | 2 | 2 | 2 | 2 | 2 | 2 | 2 | 2 | — | — |
| Percentage thermogravimetric decrease (%) | −0.54 | −0.32 | −0.23 | −0.22 | −0.22 | −0.22 | −0.23 | −0.22 | −0.22 | — | — |
| Gelling time | A | A | A | A | A | A | A | A | A | B | B |
| Solubility | A | A | A | A | A | A | A | A | B | C | C |

In Comparative Examples 2 and 3 of Table 1, the composition was gelled immediately after mixing and since a cured product could not be produced, the characteristics of the cured product could not be evaluated.

The effect due to difference in the component (a) was also examined. As the substance for the component (a), 2,2-bis[4-(methacryloxyethoxy)phenyl]propane (NK Ester BPE-100, trade name, product of Shin-Nakamura Chemical Co., Ltd.), 2-hydroxyethyl methacrylate (2-HEMA, ACRYESTER HO, trade name, product of Mitsubishi Rayon Co., Ltd.), isobornyl methacrylate (IBX, trade name, product of Kyoeisha Chemical Co., Ltd.), triethylene glycol dimethacrylate (NK Ester 3G, trade name, product of Shin-Nakamura Chemical Co., Ltd.), each in an amount of parts by weight shown in the Table; as the component (b), 1 part by weight of cumene hydroperoxide; as the component (c), 1 part by weight of o-benzoic sulfimide; as the component (d), 0.1 parts by weight of (2,2'-(-1,3-phenylene)bis(2-oxazoline) [d-1]; and as others, 0.3 parts by weight of acetylphenylhydrazine, 0.2 parts by weight of 1,2,3,4-tetrahydroquinoline, 0.02 parts by weight of EDTA.2Na, and 1 part by weight of 1-hydroxycyclohexan-1-yl phenyl ketone (Irgacure 184, trade name, product of Ciba Corporation) were prepared and formulated as curing composition samples of Blending Examples 2 to 5. Respective blending examples are shown in Table 2, and the physical property evaluation results of each sample are shown in Table 3. Incidentally, in the Table below, blending of the component (a) in Blending Composition 1 according to Examples 1 to 8 and Comparative Examples 1 to 3 is shown together as Blending Example 1.

TABLE 2

| Base Blending | Blending Example 1 | Blending Example 2 | Blending Example 3 | Blending Example 4 | Blending Example 5 |
|---|---|---|---|---|---|
| EH1010 | 70 | — | 50 | 50 | 50 |
| BPE-100 | — | 70 | — | — | — |
| 2-HEMA | 20 | 20 | 50 | — | — |
| IBX | 10 | 10 | — | 50 | — |
| 3G | — | — | — | — | 50 |

TABLE 3

|  |  | Comparative Example 4 | Example 9 | Comparative Example 5 | Example 10 | Comparative Example 6 | Example 11 | Comparative Example 7 | Example 12 |
|---|---|---|---|---|---|---|---|---|---|
| Base blending | 2 | 100 | 100 | — | — | — | — | — | — |
|  | 3 | — | — | 100 | 100 | — | — | — | — |
|  | 4 | — | — | — | — | 100 | 100 | — | — |
|  | 5 | — | — | — | — | — | — | 100 | 100 |
| Oxazoline (d-1) |  | 0 | 0.1 | 0 | 0.1 | 0 | 0.1 | 0 | 0.1 |
| Mating adhesion strength (MPa) |  | 27.2 | 26.5 | 27.8 | 28.5 | 28.4 | 27.2 | 28.4 | 27.5 |
| Set time (min) |  | 5 | 5 | 3 | 3 | 3 | 3 | 3 | 3 |
| Percentage thermogravimetric decrease (%) |  | −0.65 | −0.33 | −0.78 | −0.28 | −0.88 | −0.30 | −0.58 | −0.24 |
| Gelling time |  | A | A | A | A | A | A | A | A |

Furthermore, the component (d) was added to Blending Example 1 by changing the kind, and respective evaluations were performed. As the component (d) or comparative component, each of 2,2'-(-1,3-phenylene)bis(2-oxazoline) [d-1], 2-methyloxazoline [d-2], 2-isopropenyl-2-oxazoline [d-3], 2,2,4-trimethyl-2-oxazoline [d-4], 2-isopropyl-2-oxazoline [d-5], 2-phenyl-2-oxazoline [d-6], 2,2'-bis(2-oxazoline) [d-7], 1,2,3-benzotriazole [d-8], 3-methylisoxazole [d-9], 1-benzyl-2-methylimidazole [d-10], 2-phenylimidazole [d-11], and poly(2-isopropenyl-2-oxazoline-co-methyl methacrylate): Mw 6500 [d-12] was added in an amount of 0.1 parts by weight, and the obtained curable composition samples were evaluated. Evaluation results of each sample are shown in Table 4.

TABLE 4

|  | Example |  |  |  |  |  |  | Comparative Example |  |  |  |  |
|---|---|---|---|---|---|---|---|---|---|---|---|---|
|  | 13 | 14 | 15 | 16 | 17 | 18 | 19 | 8 | 9 | 10 | 11 | 12 |
| Component (d) | d-1 | d-2 | d-3 | d-4 | d-5 | d-6 | d-7 | d-8 | d-9 | d-10 | d-11 | d-12 |
| Mating adhesion strength (MPa) | 32.1 | 32.8 | 31.4 | 33.5 | 32.6 | 34.5 | 32.1 | 30.4 | 31.6 | 29.8 | 25.2 | 30.1 |
| Set time (min) | 2 | 2 | 2 | 2 | 2 | 2 | 2 | 2 | 2 | 1.5 | 1.5 | 2 |
| Percentage thermogravimetric decrease (%) | −0.23 | −0.45 | −0.33 | −0.26 | −0.34 | −0.36 | −0.34 | −0.55 | −0.53 | −0.55 | −0.54 | −0.55 |
| Gelling time | A | A | A | A | A | A | A | A | A | B | B | A |
| Solubility | A | A | A | A | A | A | A | A | A | A | C | C |

While the invention has been described in detail and with reference to specific embodiments thereof, it will be apparent to one skilled in the art that various changes and modifications can be made therein without departing from the spirit and scope of the invention.

This application is based on Japanese Patent Application No. 2010-062204 filed on Mar. 18, 2010, the contents of which are incorporated herein by way of reference.

INDUSTRIAL APPLICABILITY

The curable composition of the present invention can form a cured product reduced in the outgas generation amount while combining rapid curability of an anaerobic curable composition and ease of the adhesion step and can be suitably used in particular for a component requiring precise processing accuracy in the production, such as electrical/electronic components, preferably spindle motor of HDD.

The invention claimed is:

1. A curable composition comprising:
(a) a (meth)acryl functional group-containing component including the following compounds (a-1) and (a-2):
(a-1) a compound having an aromatic ring skeleton and having two or more (meth)acryloyl groups in the molecule thereof; and
(a-2) at least one selected from the group consisting of 2-hydroxyethyl (meth)acrylate, 2-hydroxypropyl (meth)acrylate, 2-hydroxybutyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, dicyclopentenyl diacrylate, and ethylene oxide-modified dicyclopentenyl di(meth)acrylate;
(b) an organic peroxide;
(c) an o-benzoic sulfimide; and
(d) an oxazoline compound,
wherein the component (d) is contained in an amount of 0.1 to 5 parts by weight based on 100 parts by weight of the component (a).

2. The curable composition according to claim 1, wherein the component (b) is contained in an amount of 0.005 to 5 parts by weight, and the component (c) is contained in an amount of 0.05 to 10 parts by weight, based on 100 parts by weight of the component (a).

3. The curable composition according to claim 1, wherein the component (d) is a compound having two or less oxazoline groups in the molecule thereof.

4. The curable composition according to claim 1, wherein the component (d) is a compound represented by the following formula (I):

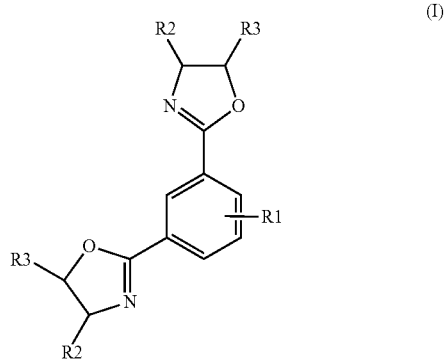

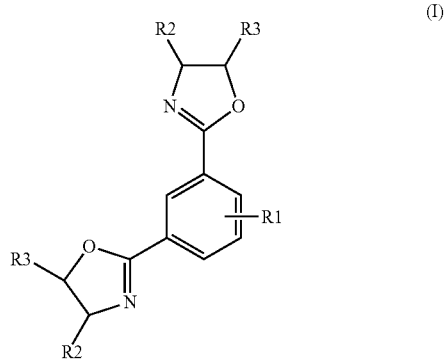

in which R1 is selected from hydrogen, a substituted or unsubstituted alkyl group having a carbon number of 1 to 6, a cyclic alkyl group and a halogen, and one R1 or a plurality of R1 may be present and may be the same as or different from one another; and each of R2 and R3 is selected from hydrogen, a substituted or unsubstituted alkyl group having a carbon number of 1 to 10, a cyclic alkyl group, an aromatic heterocyclic ring, an aliphatic heterocyclic ring and a halogen and may be the same as or different from one another.

5. The curable composition according to claim 1, further having curability imparted by at least one energy selected from heating and active light irradiation.

* * * * *